United States Patent [19]
Reinwald et al.

[11] 4,144,093
[45] Mar. 13, 1979

[54] PROCESS FOR MACHINE WASHING OF SOILED ARTICLES USING A WATER-INSOLUBLE CATION-EXCHANGE POLYMER

[75] Inventors: Elmar Reinwald, Dusseldorf-Holthausen; Milan J. Schwuger, Haan; Heinz Smolka, Langenfeld; Peter Krings, Krefeld, all of Fed. Rep. of Germany

[73] Assignee: Henkel Kommanditgesellschaft auf Aktien, Dusseldorf-Holthausen, Fed. Rep. of Germany

[21] Appl. No.: 821,968

[22] Filed: Aug. 4, 1977

Related U.S. Application Data

[63] Continuation of Ser. No. 639,465, Dec. 10, 1975, abandoned.

[30] Foreign Application Priority Data

Dec. 20, 1974 [AT] Austria .............................. 10204/74

[51] Int. Cl.² .............................................. B08B 7/04
[52] U.S. Cl. ........................................ 134/13; 8/137; 68/13 A; 134/25 R; 134/25 A
[58] Field of Search ................. 134/2, 3, 25 R, 25 A, 134/13, 109, 111; 8/137; 68/13 A; 252/176, 179, 180, 89; 210/38 A

[56] References Cited

U.S. PATENT DOCUMENTS

| | | | |
|---|---|---|---|
| 3,424,545 | 1/1969 | Bauman | 8/137 |
| 3,476,600 | 11/1969 | Morgan et al. | 134/25 A X |
| 3,619,115 | 11/1971 | Diehl et al. | 8/137 |
| 3,721,627 | 3/1973 | Adams et al. | 252/89 |
| 3,915,633 | 10/1975 | Ramachandran | 8/137 |
| 3,937,042 | 2/1976 | Loeb | 68/13 A |

FOREIGN PATENT DOCUMENTS

| | | |
|---|---|---|
| 2307923 | 10/1973 | Fed. Rep. of Germany. |
| 2216467 | 4/1974 | Fed. Rep. of Germany. |
| 2411466 | 10/1974 | Fed. Rep. of Germany. |

Primary Examiner—Marc L. Caroff
Attorney, Agent, or Firm—Hammond & Littell

[57] ABSTRACT

The machine washing of solid material (e.g. dishes and clothes) in hard water areas is enhanced when the washing solution has a dissolved content of a sequestering agent for calcium ions and is contacted with an insoluble cation exchange resin in particulate state, the washing solution being passed through a filter containing the resin during the course of the washing operation. The filter is maintained separate and spaced from the washing area. The cation exchange resin may be contained in a filter of the whirlpool type, so that the particles are maintained in aqueous suspension without coming into contact with the materials being washed, or it may be contained as a unitary porous lining of a filter.

10 Claims, 5 Drawing Figures

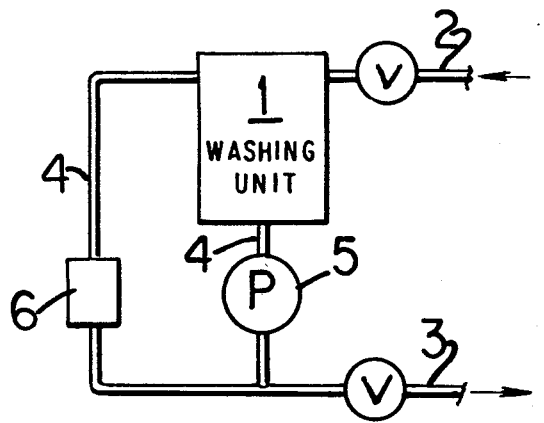
F I G. I
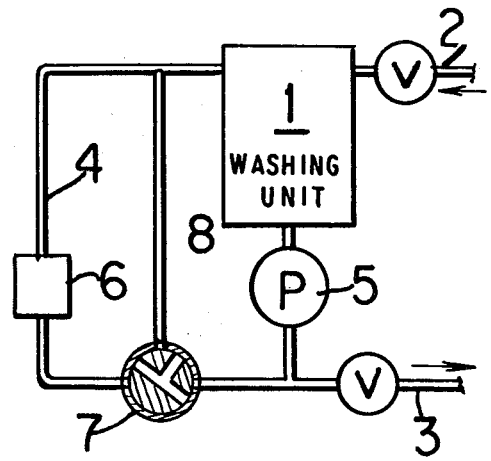
F I G. II
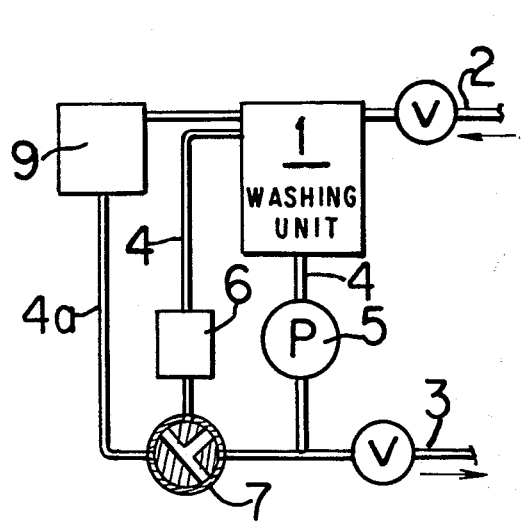
F I G. III
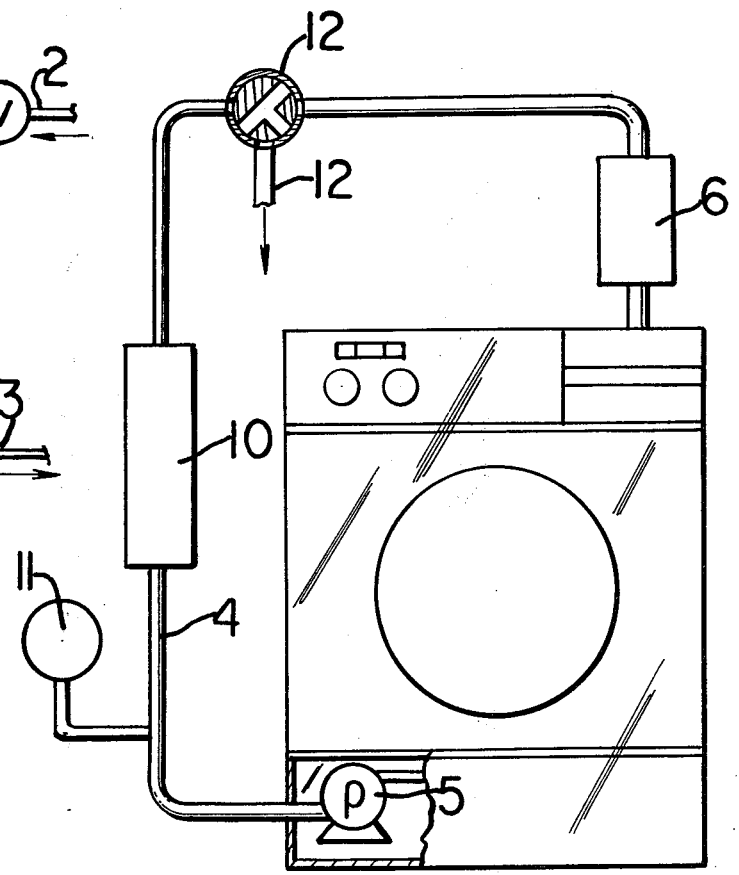
F I G. IV

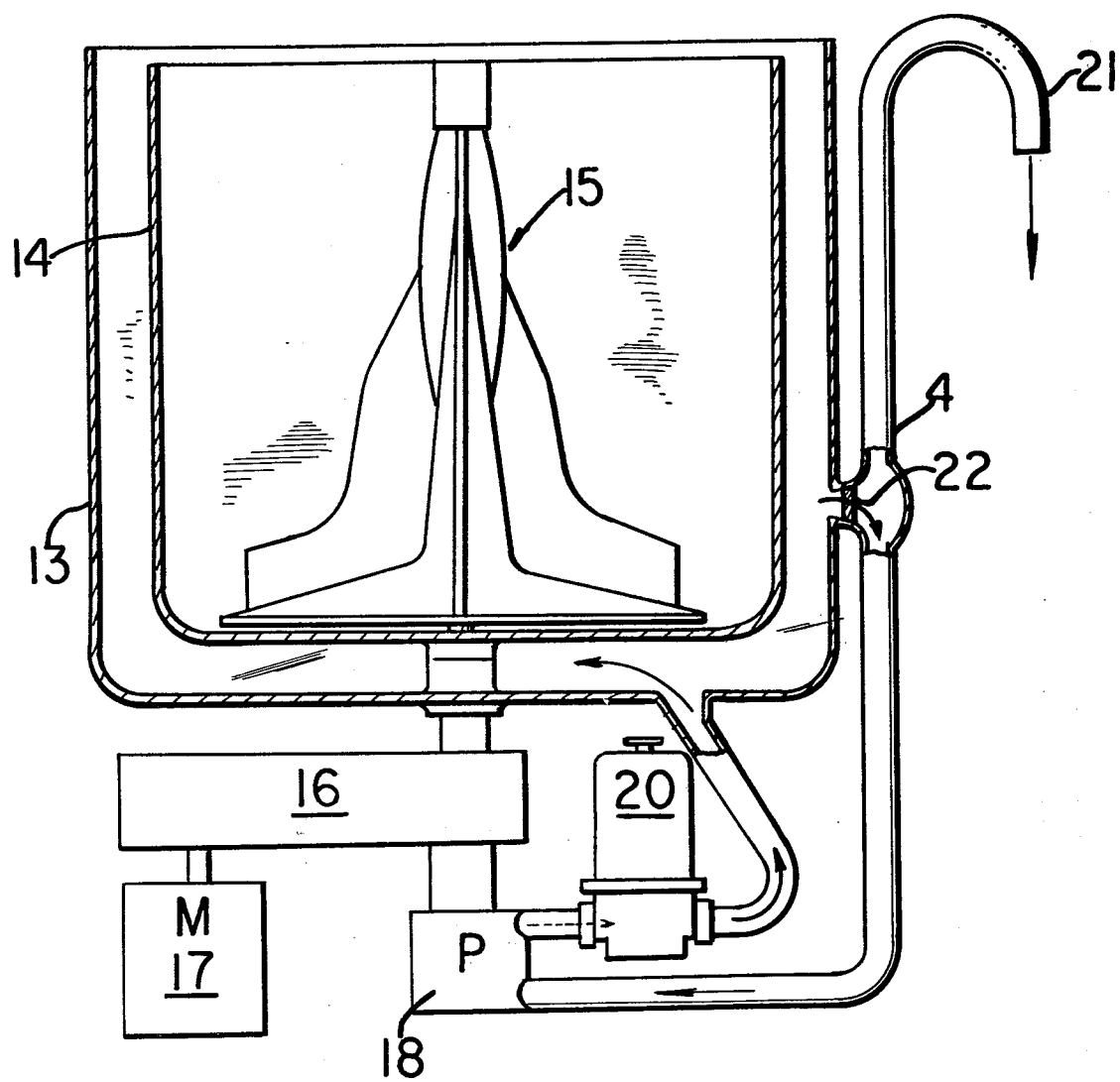
FIG. V

PROCESS FOR MACHINE WASHING OF SOILED ARTICLES USING A WATER-INSOLUBLE CATION-EXCHANGE POLYMER

This is a continuation of Ser. No. 639,465, filed Dec. 10, 1975, and now abandoned.

BACKGROUND OF THE INVENTION

Washing methods are known where the washing solution is circulated continuously during the washing process and conducted through one or more vessels in which the entrained soil can settle from the solution before it is returned into the washing process. It has already been suggested to provide screens or filters in the conduits through which the solution is circulated to retain coarse impurities or objects which could damage the mechanism. But since the bulk of the soil is usually dissolved in the washing solution or is dispersed in very fine distribution therein, cleaning or regeneration of the washing solution in this way is inadequate, and savings in certain of the washing and cleaning ingredients, for example, phosphates, can only be achieved at the expense of cleaning results.

In commercial laundries it is customary to prepare the washing solution with softened make-up water, the water used being first treated with an ion exchanger. But soft water does not have sufficient washing power even when containing surface-active agents, particularly since the soil adhering to clothes, etc. contains as a rule considerable amounts of hardness formers which are not sufficiently detached in the absence of calcium binding substances, which results in progressive incrustation of the material being washed. Furthermore it has been suggested to carry out the washing process in the presence of ion exchangers of the organic polymer type. The ion exchangers are added to the washing solution either in the form of textile-structures (i.e., textiles having a content of calcium-binding components) or as granular or powdered exchange resins. However, textiles which contain ion exchange components have a low exchange capacity, so that large amounts are required. Moreover, the space occupied by the textile is at the expense of the objects to be washed. Granular to powdered ion exchange resins tend to be entrapped by the fabric or garment being washed, unless special precautions are taken, and the powders and granules are difficult to remove. If, as it has likewise been suggested, the exchange resins are enclosed in a gauze bag to prevent them from depositing on the textile fiber, the cleaning action of the solution is considerably decreased.

FIELD OF THE INVENTION

The present invention relates to the washing of objects to remove soil therefrom, and is particularly directed at a method for improving the machine washing of clothes made out of woven textile by a process wherein the make-up water is more or less hard, by removing the hardness-forming cations therefrom by the combined action of a soluble sequestrant for calcium ions and an insoluble organic polymer having high exchange properties for calcium ions. The invention involves a method for rapidly decreasing the hardness of the water during the washing cycle without depositing insoluble granular material in clothes and without interfering with the action of anionic and non-ionic detergents present.

OBJECTS OF THE INVENTION

An object of the present invention is to provide a method for improving the machine washing of solid articles (including textiles and textile garments) with aqueous washing solutions prepared from hard water.

A further object is to provide such a method which will not place solid particles in contact with the articles being washed.

A still further object is to provide a simple and economical method for use of water-insoluble cation exchange resins in machine washing operations in conjunction with known calcium sequestering agents, so as to reduce the hardness of the water to a negligibly low level.

THE DRAWINGS

FIG. I is a flow diagram of one embodiment of practicing the process of the invention showing the filter circuit.

FIG. II is a flow diagram of another embodiment showing the filter circuit with bypass.

FIG. III is a flow diagram of a further embodiment with a filter circuit and bypass.

FIG. IV is a flow diagram of a yet further embodiment attached to a conventional clothes washer.

FIG. V is a cross-section of an agitator type clothes washer with filter circuit for the practice of the process of the invention.

SUMMARY OF THE INVENTION

A method for performing the washing has now been found which avoids these drawbacks and which leads to an above-average cleaning result, even when phosphates are not present or when they are present only in small amounts.

These and other objects are attained by the process of the present invention. The process is a method for washing objects (including textiles) with a washing solution prepared from hard water, which comprises washing the objects in a tank with the washing solution having a dissolved content between 0.05 gm./l. and 2 gm./l. of a water-soluble calcium-binding sequestrant, and cycling the same through a water-insoluble cation exchange polymer having a calcium-binding power of at least 2 mVal./gm., said polymer being a copolymer or a graft polymer derived from olefinically-unsaturated carboxylic acids, on an absorption means adapted to separate said water-insoluble cation exchange polymer from said washing solution.

The solutions used in the process contain at most only a small proportion of dissolved phosphates and need contain no phosphates at all, with consequent benefit to the ecology.

The water-insoluble cation exchange polymer may be in particulate form, suitable for addition in admixture with conventional washing compositions. In this event the machine washer is advantageously provided with a fluid bed filter, in which the particles of the cation exchange polymer are kept in suspension during the washing operation. If preferred, the cation exchange polymer can be provided in the form of a porous block and used as a bed in a conventional filter.

The combination of the sequestering agent or mixture of agents and the water-insoluble cation exchange polymer or mixture of polymers permits the hardness of the water to be decreased rapidly during the washing cycle to a very low and in fact negligible value in a simple and economical manner without harm to the active components of the washing solution or to the articles being washed.

The subject of the invention is, therefore, a method for the machine washing and cleaning of solid articles (particularly textiles and articles made therefrom) using low-phosphate or phosphate-free washing agents in conjunction with water-insoluble cation exchange polymers having a calcium binding power of at least 2 mVal./gm. These cation exchangers are copolymers or graft polymers of olefinically-unsaturated mono- or polyvalent carboxylic acids. The method is characterized in that the washing solution has a dissolved content of 0.05 to 2 gm./l. of water-soluble calcium-binding sequestrants from the class of pyro-, tri-, poly- and metaphosphates, polycarboxylic acids, hydroxycarboxylic acids, aminocarboxylic acids, carboxyalkyl ethers, and polyanionic, polymeric carboxylic and polymeric phosphonic acids, and that the solution is conducted continuously or intermittently by means of a ring conduit (i.e., a by-pass conduit) over a filter or other device suitable for separating the cation exchanger from the washing and cleaning solution, the amount of the cation-exchanger being so selected that the residual hardness of the washing and cleaning solution is 0.5 to 20 mg. CaO/l or less, and alternatively is sufficient to decrease the calcium hardness of the solution by about half, so as to render the process economic.

The water-insoluble cation exchange polymers suitable for carrying out the method are known. These are, for example, the water-insoluble copolymers of acrylic, methacrylic, crotonic, maleic, fumaric, and itaconic acid with olefinically-polyunsaturated compounds, such as alkadienes, dialkenylbenzenes, dialkenyl ethers, dialkenyloxy-alkanes and esters of unsaturated acids with polyols; as they are described, for example, in published German patent application DOS 2,411,466, which corresponds with U.S. Patent Application Ser. No. 446,153, now abandoned. They can be present, for example, in the form of swellable particles or as open-pored foams, sponges or fleeces. A variety of suitable materials of this type are disclosed in published German patent applications DOS 2,216,467 and DOS 2,307,923. Also suitable are graft polymers of olefinically-unsaturated carboxylic acids, such as the above acids, onto natural or synthetic fibers, e.g. grafts of acrylic acid or methacrylic acid on cellulose. Methods for making these grafts are shown in U.S. Pat. No. 3,721,627 and DOS 2,330,026. These can also be made by the known ceric ion graft polymerization method. The water-insoluble cation exchange polymers can be present in the form of their alkali metal salts, particularly as sodium salt, also as their lithium or potassium salts, or ammonium salts, as well as salts of organic ammonium bases, for example, alkylolamines having 1 to 3 carbons in each alkylol such as mono-, di-, or triethanolamine, or in the form of the free acids.

The amount of water-insoluble cation exchange polymer should be so selected that the residual hardness of the cleaning solution attains in the course of the washing process a value of 0.5 to 20 mg. CaO/l. Otherwise stated, the amount normally used is that which decreases the hardness of the water by at least about 50%, which is about the least amount needed to render the process economic.

If the water-insoluble cation exchange polymer is present in granular or powdered form, it is advisable to select the particle size so that the particles are larger than 20 μ in swollen state, particularly larger than 30 μ, in order to achieve a good filtering effect. The upper limit of the particle size is determined only by the penetrability of the exchange material and the dimensions of the filter or other separatory device. When sufficiently porous, the water-insoluble cation exchange polymer can also be present in macro form, for example, as a sponge or fleece or as cotton wadding. Finally, the material can be shaped in the form of a filter cartridge, a filter plate or a filter cloth, so that the use of a special filter material is not necessary.

Clogging of the filter when using the finely-divided water-insoluble cation exchange polymers can also be prevented and at the same time the washing process accelerated and the cleaning result improved and the existing exchanger capacity better utilized by keeping the polymer particles constantly in motion inside the adsorption means, for example, by recycling the cleaning solution intermittently or repeatedly, or reversing its direction of flow during the washing process. Preferably a so-called "fluid bed filter" is used, where the turbulence of the filter contents is increased by a corresponding design of the filter, of the filter vessel or of the feed lines.

In the washing and cleaning process of the invention small amounts of sequestrants or precipitants for calcium are used, for example from 0.05 to 2 gm./l. particularly amounts of 0.1 to 1 gm./l are used. Substantially larger amounts can also be used, but in the case of phosphorus-containing sequestrants or precipitants the amounts should be so selected that the phosphorus load of the waste water is less than with the use the customary detergents based on tripolyphosphate.

The sequestrants or precipitants comprise those of an inorganic nature, like the alkali metal or ammonium condensed phosphates such as pyrophosphate, tripolyphosphate, higher polyphosphates and metaphosphates, particularly of the sodium salts.

Organic compounds which can be used as water-soluble calcium-binding sequestrants or precipitants for calcium are found among the polycarboxylic acids, hydroxycarboxylic acids, aminocarboxylic acids, carboxyalkyl ethers, polyanionic polymers, particularly the polymeric carboxylic acids and the phosphonic acids, which are employed in the form of their free acids as well as the alkali metal or ammonium salts, preferably as sodium salts. These materials are water-soluble in amounts of at least 2 gm./l. and, preferably, water-soluble in the form of the calcium sequestered salt at this concentration.

Examples of polycarboxylic acids are dicarboxylic acids of the general formula $HOOC-(CH_2)_n-COOH$ with $n = 0$ to 8: in addition unsaturated polycarboxylic acids such as maleic acid, methylene-malonic acid, citraconic acid, mesaconic acid, itaconic acid: non-cyclic polycarboxylic acids with an least 3 carboxyl groups in the molecule, such as tricarballylic acid, aconitic acid, ethylene tetracarboxylic acid, 1,1,3,3-propane-tetracarboxylic acid, 1,1,3,3,5,5- pentane-hexacarboxylic acid, hexanehexacarboxylic acid: cyclic di- or polycarboxylic acids such as cyclopentane-tetracarboxylic acid, cyclohexane-hexacarboxylic acid, tetrahydrofuran-tetracarboxylic acid, phthalic acid, terephthalic acid, benzene-tricarboxylic acid, benzene tetracarboxylic acid or benzene pentacarboxylic acid, as well as mellitic acid.

Examples of hydroxymonocarboxylic acids or hydroxypolycarboxylic acids are glycolic acid, lactic acid, malic acid, tartronic acid, methyl-tartonic acid, gluconic acid, glyceric acid, citric acid, tartaric acid, and salicylic acid.

Examples of aminocarboxylic acids are glycine, glycylglycine, alanine, asparagine, glutamic acid, aminobenzoic acid, iminodi- or triacetic acid, hydroxyethyl-iminodiacetic acid, ethylenediaminetetraacetic acid, hydroxyethyl-ethylenediamine-triacetic acid, diethylenetriaminepentaacetic acid, as well as higher homologs, which can be obtained by polymerization of a N-aziridyl-carboxylic acid derivative such as N-aziridylacetic acid, N-aziridyl-succinic acid, or N-aziridyl-tricarballylic acid and subsequent saponification or by condensation of polyimines with a molecular weight of 500 to 10,000 with salts of chloracetic or bromoacetic acid.

Examples of carboxyalkyl ethers are 2,2-oxydisuccinic acid and other ether polycarboxylic acids, particularly polycarboxylic acids containing carboxymethyl ether groups which comprise corresponding derivatives of the following polyhydic alcohols or hydroxycarboxylic acids, which can be completely or partly etherified with glycolic acid: ethylene glycol, di- or tri-ethylene-glycols, glycerin, di- or triglycerin, glycerin monomethyl ether 2,2-dihydroxymethyl-propanol 1,1,1-trihydroxymethyl-ethane, 1,1,1-trihydroxymethyl-propane, erythritol, pentaerythritol, glycolic acid, lactic acid, tartronic acid, methyl-tartronic acid, glyceric acid, erythronic acid, malic acid, citric acid, tartaric acid, trihydroxy glutaric acid, saccharic acid, and music acid.

The water-soluble carboxymethyl ethers of sugar, starch and cellulose are transition types to the water-soluble polymeric carboxylic acids.

Among the water-soluble polymeric carboxylic acids, the polymers of acrylic acid, hydroxyacrylic acid, maleic acid, itaconic acid, mesaconic acid, aconitic acid, methylene-malonic acid, citraconic acid, etc., as well as the copolymers of the above mentioned carboxylic acids with each other or with ethylenically-unsaturated compounds, like ethylene, propylene, isobutylene, vinyl alcohol, vinyl methyl ether, furan, acrolein, vinyl acetate, acrylic amide, acrylonitrile, methacrylic acid, crotonic acid, etc. such as the 1:1 copolymers of maleic acid anhydride and ethylene or propylene or furane, play a special role.

Other water-soluble polymeric carboxylic acids of the type of the polyhydroxy-polycarboxylic acids or polyaldehydropolycarboxylic acids are substances composed substantially of acrylic acid and acrolein units or acrylic acid and vinyl alcohol units, which are obtained by copolymerization of acrylic acid and acrolein or by polymerization of acrolein and subsequent Cannizzaro reaction, if necessary, in the presence of formaldehyde.

Examples of water-soluble phosphorus-containing organic sequestrants are the lower alkane polyphosphonic acids, the amino- lower alkane polyphosphonic acids, the hydroxy- lower alkane polyphosphonic acids and the phosphono- lower alkane carboxylic acids, specifically methanediphosphonic acid, propane-1,2,3-triphosphonic acid, butane-1,2,3,4-tetraphosphonic acid, 1-amino-ethane-1, 1-diphosphonic acid, 1-amino-1-phenyl-methane-1, 1-diphosphonic acid, aminotrimethylene triphosphonic acid, methylamine- or ethylamino dimethylenephosphonic acid, ethylene-diaminotetramethylenephosphonic acid, 1-hydroxyethane-1, 1-diphosphonic acid, phosphono-acetic acid, phosphonopropionic acid, 1-phosphonoethane-1, 2-dicarboxylic acid, 2-phosphonopropane-2,3-dicarboxylic acid, 2-phosphonobutane-1,2,4-tricarboxylic acid, 2-phosphonobutane-2,3,4-tricarboxylic acid, as well as polyvinyl phosphonic acid and copolymers of vinyl phosphonic acid and acrylic acid.

When using phosphorus containing inorganic or organic sequestrants or precipitants, the method according to the invention permits the content of inorganically and/or organically combined phosphorus in the treatment liquors to be decreased to below 0.6 gm./l. preferably to below 0.3 gm./l. If desired the washing solution used in the process need contain no phosphorus-containing compounds at all.

In addition to washing textiles, which is the preferred field of application, the method and the device according to the invention can also be used in commercial or in household dishwashing machines.

Depending on the use, customary surface-active compounds or tensides, builder substances which increase the cleaning power, bleaching agents as well as compounds stabilizing or activating these bleaching agents, soil suspension agents, optical brighteners, biocides or bacteriostatic substances, enzymes, foam inhibitors, corrosion inhibitors and agents regulating the pH of the washing solution can be present in the washing and cleaning process.

When using one or more of the above-mentioned substances normally contained in the washing and cleaning liquors, the following concentrations are preferably maintained:

0.01 to 2.5 gm./l. surface-active compounds
0.05 to 2 gm./l. sequestrants
0 to 3 gm./l. other builder substances
0 to 0.4 gm./l. active oxygen or equivalent amounts of active chlorine The pH of the washing solution can vary between 6 and 13 and preferably is alkaline, between 8.5 and 12, depending on the substrate to be washed or cleaned.

The temperature of the washing solution during use can be between 30° C. and 100° C. Since the washing and cleaning effect is already achieved at low temperature, that is, at 30° C. to 40° C. even delicate fabrics such as those of wool or silk, or fine porcelain dishes with a delicate overglaze or gold trim can be washed without damage.

The washing or cleaning time at the anticipated treatment temperature depends on the degree of soiling, the calcium exchange rate, and the output of the circulating pump. It can, therefore, vary within wide limits, for example, between five minutes and two hours. Preferably it is between 10 and 60 minutes. When the water-insoluble cation exchange polymer is confined in a vessel out of contact with the material being washed, the output of the feed pump and of the filter are preferably so selected that the washing solution passes a total of at least five times, and preferably 10 times to 50 times through the filter containing the water-insoluble cation exchange polymer. The filter may become clogged and difficult to penetrate by deposited material or dirt. It is, therefore, advisable to use pumps which still provide a sufficient flow rate despite normal clogging at a backpressure e.g. of 1 to 2 atmospheres gauge above normal.

Of advantage are filters of the type which permit the water-insoluble cation exchange polymer, when in particulate form, to be intensively whirled, so that there are no substantial deposits of the polymer solids forming on the filter during the washing process. Such a fluid bed arrangement permits shorter washing times compared to a static bed arrangement of the exchanger, and the dimensions of the filter may be smaller and the pump therefore less elaborate. By intermittent operation or reversal of the flow it is possible to further prevent clogging under certain circumstances.

The pore width of the filter depends on the particle size of the water-insoluble cation exchange polymer. Since the deposited material or the additionally used filter aid also have a filter effect, the pore width can be greater than that corresponding to the particle size of the fines in the interest of a lower flow resistance.

The filter can consist of any material, for example, paper, textile fabric, ceramic material or the exchange material itself. Paper filters which are discarded together with the deposited water-insoluble cation exchange polymer as well as mechanical impurities and lint, or in dishwashing machines food remnants removed from the substrate or retained by the filter are employed advantageously. The advantage is that new exchange material with a reproducible activity is used for each cleaning process. Neither the water-insoluble cation exchange polymer nor the filter material as "pollution-free" garbage represent a burden for the garbage dumps and incinerators. On the other hand, the exchange polymer can also be regenerated. The regeneration is preferably effected with highly concentrated common salt solutions. The regeneration can also be effected with solutions of the above mentioned sequestrants, but this is less advisable for reasons of costs and because of the possible pollution of the sewage by the spent solutions.

The device according to the invention consists thus at least of the following elements:
(a) a washing or cleaning unit of a conventional or modified type
(b) the outside circulating means equipped with a circulating pump
(c) at least one adsorption means (filter) arranged in the outside circulating means for the water-insoluble cation exchange polymer used.

DESCRIPTION OF THE DRAWINGS

The invention is further illustrated by the drawings, wherein:

FIGS. I, II AND III are flow diagrams of processes according to the present invention;

FIGS. IV AND V respectively show flow and filter means in conventional washing machines.

In the figures, the same numbers designate similar or equivalent components.

In FIG. I the apparatus consists of washing or cleaning tank 1 equipped with valved make-up water inlet 2, valved outlet 3 for discharge of the washing solution; and ring conduit 4, circulating pump 5, and vessel 6 for containing the water-insoluble cation exchange polymer.

FIG. II illustrates a modification of the apparatus of FIG. I where a part of all of the washing solution is by-passed around vessel 6 and is thus returned directly into washing tank 1. For this purpose ring conduit 4 is provided with three-way valve 7 and by-pass conduit 8 which thus permits part or virtually all of the wash water to be circulated through or around the vessel containing the ion exchange polymer. This arrangement is provided for those washing or cleaning units where the mechanical treatment of the material to be washed or cleaned is effected by directing the washing solution from stationary or movable spray nozzles, as it is customary, for example, in dishwashing machines or in washing machines wherein the textiles are suspended. A filter arranged in the main circulating conduit would offer in these cases a too high resistance to the washing solution. Valve 7 can be operated intermittently if desired. In continuous washing or spraying plants it is also possible to arrange in parallel two or more containing vessels for the polymer which are equipped with shutoff and draining devices. The exhausted polymer and filter element in one vessel can then be replaced while the other vessel permits the process to be continued.

FIG. III shows a flow plan which permits all or part of the unspent washing solution to be transferred after use through valve 7 into storage tank 9 where it is stored for use in a subsequent washing process. For this purpose vessel 6 is by-passed by three-way valve 7, conduit 4a and storage tank 9.

FIG. IV shows a machine washer used in the examples. In addition to the circulation 5 and polymer removal 6 units are here provided flow meter 10, manometer 11 and discharge-and sampling take-off pipe 12 supplied by a three-way cock 7 in order to be able to determine the condition of the washing solution during the washing process, e.g. the degree of clouding or soiling of the filtered washing solution.

Another machine washer used in the examples is shown in FIG. V. It consists of a conventional agitator washing machine with a spinning basket with washing solution tank 13, basket 14 for holding the articles to be washed, and an agitator 15 for mechanically agitating the wash. The basket and the agitator are driven through a gear train 16 by motor 17. The same gear train 16 also drives circulating pump 18. The circulated washing solution flows from tank 13 into ring conduit 4 to pump 18 and from there into fluid bed filter 20 back to washing solution tank 13. After completion of the washing process, the washing solution is discharged through outlet 21 by reversing the pump, non-return valve 22 being closed to prevent the washing solution from flowing back into the washing solution tanks.

The invention is further illustrated by the examples which follow. These examples are best embodiments of the invention and are not to be construed in limitation thereof.

EXAMPLES

The following water insoluble cation exchange polymers were employed in the examples:
  I. An exchanger in the form of sodium salt, obtained by copolymerizing 95 mol.% of acrylic acid and 5 mol.% of hexamethylene-bis-acrylamide, with a capacity of 8.2 mVal/gm., the resin had a mean particle size (unswollen) of 0.05 mm. and of about 0.15 mm. when swollen in water.
  II. A polyacrylate exchanger (Na salt) prepared according to Example 2 of DOS 2,411,466 in the form of a finely ground open-pored foam with a particle size of 0.1 mm. (unswollen) and a cation binding capacity of 10.5 mVal/gm.

The washing machine used was the apparatus of FIG. IV, equipped with a fluid bed (whirlpool) filter of the type wherein the arriving wash solution enters the interior of the cylindrical filter vessel tangentially, passes through the filter bag of textile material, and flows back to the washing machine from there, leaving the particles of the water-insoluble cation exchange polymer within the bag.

The washing solution contained (in grams per liter of washing solution):

0.5 Na n-dodecylbenzenesulfonate
0.17 tallow fatty alcohol adducted with 14 mols of ethylene oxide
0.27 Na tallow fatty acid soap/Na behenate (1:1)
0.26 Na silicate ($Na_2O:SiO_2 = 1:3.3$)
0.11 Na carboxymethylcellulose
0.2 magnesium silicate
0.2 sodium sulfate.

In one test series the filter was charged with the cation exchange polymer. In a second test series the cation exchange polymer was omitted. Furthermore a similar test was performed with a soluble sequestrant and another test was performed without such a sequestrant (comparison test).

| Test Arrangement | Exchanger gm./l. | Additive gm./l | Name |
|---|---|---|---|
| a | none | none | |
| b | " | 2.5 Na | tripolyphosphate |
| c | " | 0.4 Na | tripolyphosphate |
| d | " | 0.4 Na | tripolyphosphate + |
| | | 0.4 Na | citrate |
| e | 2.5 | none | |
| f | 2.5 | 0.4 Na | tripolyphosphate |
| g | 2.5 | 0.4 Na | citrate |
| h | 2.5 | 0.4 Na | tripolyphosphate + |
| | | 0.4 Na | citrate |

The washing machine was loaded with 3 kg. of clean wash and two soiled textile samples (1 kg. altogether) of:
Cotton (C)
Finished cotton (FC) and a 1:1 blend of finished cotton and polyester (C/P). The soil consisted of skin fat, kaolin, black iron oxide and carbon black. The hardness of the tap water was 16° dH (160 mg. CaO/l.), the amount of wash liquor was 20 liters and the washing time was 40 minutes at 90° C. for the cotton and finished cotton samples and 60° C. for the blended fabric. The pump provided recirculation continuously at a rate of 12 liters per minute. The samples were then rinsed three times, spun and dried. The remission (extent of cleaning) of the soiled textile samples was determined by photometry. The results are compiled in the following table.

| Example | Arrangement | Exchanger | % Remission | | |
|---|---|---|---|---|---|
| | | | C. | F.C. | C/P |
| — | a | None | 55 | 57 | 52 |
| — | b | " | 79 | 80 | 67 |
| — | c | " | 55 | 58 | 54 |
| — | d | " | 57 | 58 | 54 |
| — | e | I | 76 | 68 | 54 |
| 1 | f | I | 80 | 70 | 55 |
| 2 | g | I | 80 | 70 | 56 |
| 3 | h | I | 82 | 73 | 56 |
| — | e | II | 77 | 66 | 54 |
| 4 | f | II | 81 | 72 | 56 |
| 5 | g | II | 80 | 71 | 56 |
| 6 | h | II | 82 | 73 | 56 |

The tests were repeated using a detergent of the following composition (gm./l. of washing solution):
0.5 oxoalcohol ($C_{14-17}$) adducted with 12 mols of ethylene oxide
0.17 tallow fatty alcohol adducted with 5 mols of ethylene oxide
0.27 Na tallow fatty acid soap/Na behenate (1:1)
0.25 Na silicate ($Na_2O:SiO_2 = 1:3.3$)
0.11 Na carboxymethylcellulose
0.2 magnesium silicate
0.2 sodium sulfate This formulation is suitable particularly for textiles of finished cotton and blended fabric.

The washing was performed in a machine according to FIG. V, the washing solution being prepared first, after which the water-insoluble cation exchange polymer was added. After five minutes of circulation through the pump, the exchanger had accumulated completely in the fluid bed (whirlpool) filter. The articles to be washed were then put into the washing solution in the basket and the washing process was started. The other test conditions were the same as in the Examples 1-6.

The results of the remission measurements are shown in the following table.

| Example | Arrangement | Exchanger | % Remission | | |
|---|---|---|---|---|---|
| | | | C | F.C. | C/P |
| — | a | — | 79 | 68 | 60 |
| — | c | — | 80 | 71 | 68 |
| — | d | — | 80 | 72 | 70 |
| — | e | I | 80 | 70 | 65 |
| 7 | f | I | 82 | 75 | 74 |
| 8 | g | I | 82 | 75 | 73 |
| 9 | j | I | 82 | 76 | 75 |
| — | e | II | 80 | 70 | 65 |
| 10 | f | II | 82 | 76 | 74 |
| 11 | g | II | 82 | 76 | 73 |
| 12 | h | II | 82 | 76 | 75 |

The preceding specific embodiment are illustrative of the practice of the invention. It is to be understood, however, that other expedients known to those skilled in the art or disclosed herein, may be employed without departing from the spirit of the invention or the scope of the appended claims.

We claim:

1. A cyclic method for the machine washing of soiled solid materials with a washing solution prepared from hard water in a washing area, which comprises in sequence:

(a) forming a charge of an aqueous washing solution having a dissolved content between 0.05 gm/liter and 2 gm/liter of a water-soluble calcium-binding sequestrant, and customary surface-active compounds selected from the group consisting of an anionic detergent and a nonionic detergent, (b) filtering said washing solution through a filter bed separate and spaced from the washing area to form a filtrate, said filter bed having a previously incorporated content of a water-insoluble cation-exchange polymer in particulate state having a swelled average particle diameter in excess of 20μ and having a calcium binding power of at least 2 mVal/gm, said polymer being a copolymer or graft polymer derived from olefinically-unsaturated carboxylic acids, said water-insoluble cation-exchange polymer being separated from said washing solution by said filter bed, the amount of the water-insoluble cation-exchange polymer being so selected that the residual hardness of the filtrate is less than 20 mg CaO/liter;

(c) washing said soiled material with said filtrate as washing medium;

(d) continuously pumping at least part of said washing medium through said particulate cation-exchange polymer on said filter bed and recycling the filtrate having less than 20 mg CaO/l to said washing area, at such a rate that said washing medium passes a total of at least five times through said particulate cation-exchange polymer during said washing step; and (e) continuing said recycling until said soiled solid material is substantially cleaned.

2. A process according to claim 1 wherein said water-soluble calcium-binding sequestrant is selected from the group consisting of the pyrophosphates, tripolyphosphates, polyphosphates and metaphosphates; polycarboxylic acids; hydroxycarboxylic acids; aminocarboxylic acids; carboxyalkyl ethers; polyanionic polymeric acids; polyphosphonic acids, and mixtures thereof.

3. A process according to claim 1 wherein the amount of said sequestrant is 0.1 to 1 gram per liter of said solution.

4. A process according to claim 1 wherein said water-insoluble cation exchange polymer is a copolymer of a molar excess of acrylic acid and hexamethylene-bisacrylamide.

5. A process according to claim 1 wherein said water-insoluble cation exchange polymer has a calcium binding capacity in excess of 8 mVal/gm.

6. A process according to claim 1 wherein the solid materials washed are textile garments.

7. A process according to claim 1 wherein the washing solution contains less than 0.6 gram per liter of combined phosphorus.

8. A process according to claim 1 wherein the washing solution contains substantially no combined phosphorus.

9. A process according to claim 1 wherein said washing solution is cycled from 10 to 50 times through said particulate cation-exchange polymer.

10. A method according to claim 1 wherein the temperature of the washing solution is between about 30° C. and 100° C.

* * * * *